UNITED STATES PATENT OFFICE.

FRANZ O. MATTHIESSEN, OF NEW YORK, N. Y.

IMPROVEMENT IN PROCESSES OF MANUFACTURING HARD SUGAR.

Specification forming part of Letters Patent No. 161,424, dated March 30, 1875; reissue No. 6,413, dated May 4, 1875; application filed April 23, 1875.

*To all whom it may concern:*

Be it known that I, FRANZ O. MATTHIESSEN, of the city and State of New York, have invented a certain Improvement in the Process of Manufacturing Hard Sugar, of which the following is a specification:

My invention relates to the manufacture of hard sugar in cubes, blocks, or pieces. In the ordinary process of manufacture hard sugar is completely dried in bulk—that is, in the shape imparted to the mass by the molds which contain it. Afterward it is sawed or cut into cubes or blocks of the sizes required for use. The object of my invention is to facilitate the operation of cutting, and also to utilize it for the purpose of promoting a more rapid drying of the sugar; and my invention consists in cutting the mass of sugar, while in a soft state, into cubes or pieces of the shape and size required, and then subjecting it to the drying operation. The sugar is more easily cut when soft, and by thus dividing the mass into small pieces a more extensive drying-surface is obtained, and the drying operation takes less time.

In my manufacture the sugar is purged and drained, or otherwise treated, as may be desired, in the molds; but while it is still in a soft state I remove it from the molds, and cut it into pieces of the shape and size required, by means of saws or other suitable cutting-instruments, and then subject the pieces so cut to any suitable drying process, by which the product is brought into the usual hard state.

This division of the mass of sugar may be carried to the extent of producing the small cubes required for use, or the mass may be divided into strips or prisms, which, after being dried, are cut or broken into short lengths.

I am aware that moist granular sugar, or, as it is commonly called, coffee sugar, has been rolled or pressed into sheets, and such pressed sheets have then been cut into blocks preparatory to being dried; but in my process the granular structure acquired by the sugar in the molds in which it is purged and drained is not disturbed or modified by compression. Instead of rolling or pressing it into sheets, I cut it into slabs of the desired thickness, and then cut the slabs into pieces of the required size.

I claim as my invention—

As an improvement in manufacturing hard sugar, the process herein described, which consists in removing the sugar from the molds in which it is purged and drained while it is yet soft, and when so removed cutting it into slabs of the desired thickness, and in cutting such slabs into pieces of the required size, and then subjecting such pieces to the drying operation, as and for the purposes specified.

F. O. MATTHIESSEN.

Witnesses:

A. A. GRIFFING,
EDWD. PAYSON.